(12) United States Patent
Navarrete Michelini et al.

(10) Patent No.: US 11,615,505 B2
(45) Date of Patent: Mar. 28, 2023

(54) APPARATUS AND METHOD FOR IMAGE PROCESSING, AND SYSTEM FOR TRAINING NEURAL NETWORK

(71) Applicant: BOE TECHNOLOGY GROUP CO., LTD., Beijing (CN)

(72) Inventors: Pablo Navarrete Michelini, Beijing (CN); Dan Zhu, Beijing (CN); Hanwen Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 749 days.

(21) Appl. No.: 16/604,410

(22) PCT Filed: Apr. 23, 2019

(86) PCT No.: PCT/CN2019/083872
§ 371 (c)(1),
(2) Date: Oct. 10, 2019

(87) PCT Pub. No.: WO2020/062846
PCT Pub. Date: Apr. 2, 2020

(65) Prior Publication Data
US 2021/0334642 A1    Oct. 28, 2021

(30) Foreign Application Priority Data

Sep. 30, 2018 (CN) .......................... 201811155147.2
Sep. 30, 2018 (CN) .......................... 201811155252.6
(Continued)

(51) Int. Cl.
*G06T 3/20* (2006.01)
*G06N 3/04* (2006.01)
(Continued)

(52) U.S. Cl.
CPC .............. *G06T 3/20* (2013.01); *G06K 9/6232* (2013.01); *G06K 9/6257* (2013.01);
(Continued)

(58) Field of Classification Search
CPC .............. G06T 3/20; G06T 2207/20081; G06T 2207/20084; G06T 3/4046; G06T 3/4007;
(Continued)

(56) References Cited

U.S. PATENT DOCUMENTS 6,766,067 B2    7/2004   Freeman et al.
9,727,959 B2    8/2017   Meyers et al.
(Continued)

FOREIGN PATENT DOCUMENTS

CN    101593269 A    12/2009
CN    101872472 A    10/2010
(Continued)

OTHER PUBLICATIONS

Khan, Amir. Implementation and Experiments on Face Detection System (FDS) Using Perceptual Quality Aware Features. MS thesis. Eastern Mediterranean University EMU-Doğu Akdeniz Üniversitesi (DAÜ), 2017. (Year: 2017).*
(Continued)

*Primary Examiner* — Geoffrey E Summers
(74) *Attorney, Agent, or Firm* — WHDA, LLP

(57) ABSTRACT

The present disclosure generally relates to the field of deep learning technologies. An apparatus for generating a plurality of correlation images may include a feature extracting unit configured to receive a training image and extracting at least one or more of feature from the training image to generate a first feature image based on the training image; a normalizer configured to normalize the first feature image and generate a second feature image; and a shift correlating unit configured to perform a plurality of translational shifts
(Continued)

on the second feature image to generate a plurality of shifted images, correlate each of the plurality of shifted images with the second feature image to generate the plurality of correlation images.

19 Claims, 8 Drawing Sheets

(30) Foreign Application Priority Data

Sep. 30, 2018 (CN) .......................... 201811155326.6
Sep. 30, 2018 (CN) .......................... 201811155930.9

(51) Int. Cl.
| | | |
|---|---|---|
| G06N 3/08 | (2006.01) | |
| G06T 3/40 | (2006.01) | |
| G06V 10/75 | (2022.01) | |
| G06V 10/82 | (2022.01) | |
| G06V 10/42 | (2022.01) | |
| G06N 3/088 | (2023.01) | |
| G06T 5/00 | (2006.01) | |
| G06T 5/50 | (2006.01) | |
| G06K 9/62 | (2022.01) | |

(52) U.S. Cl.
CPC ......... *G06K 9/6268* (2013.01); *G06N 3/0454* (2013.01); *G06N 3/0481* (2013.01); *G06N 3/08* (2013.01); *G06N 3/088* (2013.01); *G06T 3/4007* (2013.01); *G06T 3/4046* (2013.01); *G06T 3/4076* (2013.01); *G06T 5/002* (2013.01); *G06T 5/007* (2013.01); *G06T 5/50* (2013.01); *G06V 10/42* (2022.01); *G06V 10/751* (2022.01); *G06V 10/82* (2022.01); *G06T 2207/20081* (2013.01); *G06T 2207/20084* (2013.01); *G06T 2207/20212* (2013.01)

(58) Field of Classification Search
CPC ......... G06T 3/4076; G06T 5/002; G06T 5/50; G06T 2207/20212; G06T 3/4053; G06T 3/40; G06K 9/6257; G06K 9/6268; G06K 9/62; G06K 9/00; G06V 10/7747; G06V 30/19147; G06V 10/764; G06V 30/19173; G06V 10/70; G06V 10/766; G06V 30/19; G06V 10/42; G06V 30/186; G06V 10/751; G06V 10/10; G06V 10/20; G06V 30/19013; G06V 10/82; G06V 10/454; G06V 30/18057; G06V 10/40; G06V 10/54; G06V 30/18; G06N 3/02–088

See application file for complete search history.

(56) References Cited

U.S. PATENT DOCUMENTS

| 9,865,036 B1 | 1/2018 | Liu et al. |
|---|---|---|
| 2017/0365038 A1 | 12/2017 | Denton et al. |
| 2018/0075581 A1 | 3/2018 | Shi et al. |
| 2019/0129858 A1* | 5/2019 | Liu .................... G06F 12/0875 |
| 2019/0156201 A1* | 5/2019 | Bichler ................. G06N 3/063 |

FOREIGN PATENT DOCUMENTS

| CN | 103514580 A | 1/2014 |
|---|---|---|
| CN | 103903236 A | 7/2014 |
| CN | 105144232 A | 12/2015 |
| CN | 103903236 B | 8/2016 |
| CN | 105975931 A | 9/2016 |
| CN | 105975968 A | 9/2016 |
| CN | 107133601 A | 9/2017 |
| CN | 107154023 A | 9/2017 |
| CN | 107527044 A | 12/2017 |
| CN | 107767343 A | 3/2018 |
| CN | 107977932 A | 5/2018 |
| CN | 108052940 A | 5/2018 |
| CN | 108154499 A | 6/2018 |
| CN | 108268870 A | 7/2018 |
| CN | 108334848 A | 7/2018 |
| CN | 108416428 A | 8/2018 |
| CN | 108476291 A | 8/2018 |
| CN | 108596830 A | 9/2018 |
| CN | 109255390 A | 1/2019 |
| RU | 2635883 C1 | 11/2017 |
| WO | 02089046 A1 | 11/2002 |
| WO | 2017/100903 A1 | 6/2017 |

OTHER PUBLICATIONS

"Rgb2gray," Matlab. <https://www.mathworks.com/help/matlab/ref/rgb2gray.html>, accessed Mar. 13, 2015, Internet Archive. <https://web.archive.org/web/20150313063006/https://www.mathworks.com/help/matlab/ref/rgb2gray.html>. (Year: 2015).*
"Translate an Image Using imtranslate Function," Matlab. <https://www.mathworks.com/help/images/translate-an-image.html>, accessed Mar. 24, 2017, Internet Archive, <https://web.archive.org/web/20170324231436/https://www.mathworks.com/help/images/translate-an-image.html>. (Year: 2017).*
"Circshift," Matlab. <https://www.mathworks.com/help/matlab/ref/circshift.html>, accessed Mar. 13, 2015, Internet Archive, <https://web.archive.org/web/20150313091546/https://www.mathworks.com/help/matlab/ref/circshift.html>. (Year: 2015).*
"Imtranslate," Matlab, <https://www.mathworks.com/help/images/ref/imtranslate.html>, accessed Mar. 19, 2015, Internet Archive, <https://web.archive.org/web/20150319235417/https://www.mathworks.com/help/images/ref/imtranslate.html>. (Year: 2015).*
Mittal, Anish, Anush Krishna Moorthy, and Alan Conrad Bovik. "No-reference image quality assessment in the spatial domain." IEEE Transactions on image processing 21.12 (2012): 4695-4708. (Year: 2012).*
Office Action dated Nov. 8, 2021, issued in counterpart IN Application No. 202047021736, with English Translation. (6 pages).
Office Action dated Dec. 27, 2021, issued in counterpart IN Application No. 202027055323, with English Translation. (5 pages).
Office Action dated Oct. 29, 2021, issued in counterpart KR Application No. 10-2020-7014462, with English Translation. (11 pages).
Notice of Acceptance for Patent Application dated Sep. 28, 2021, issued in counterpart AU Application No. 2019350918. (3 pages).
Michelini et al., "Multi-Scale Recursive and Perception-Distortion Controllable Image Super-Resolution", ECCV, and Sep. 14, 2018, pp. 1-16.; Cited in KR Office Action dated Oct. 29, 2021. (16 page).
Liu et al., "Deep networks for image-to-image translation with Mux and Demux Layers", ECCV, and Sep. 14, 2018, pp. 1-16; Cited in KR Office Action dated Oct. 29, 2021. (16 page).
Office Action dated Feb. 11, 2020, issued in counterpart CN Application No. 201811155930.9, with English translation. (20 pages).
Office Action dated Apr. 27, 2020, issued in counterpart CN Application No. 201811155147.2, with English translation. (13 pages).
Office Action dated Oct. 27, 2020, issued in counterpart CN Application No. 201811155147.2, with English translation. (7 pages).
Gao, Yuan et al., "Medical image super-resolution algorithm based on deep residual generative adversarial network", Journal of Computer Applications, 2018, 38(9), p. 2689-2695, with English Abstract; Cited in CN Office Action dated Apr. 27, 2020. (7 pages).
Le, Zou, "Reflection Removal with Generative Adversarial Networks", A Dissertation Submitted for the Degree of Master (South China University of Technology Guangzhou, China), with English Abstract; Cited in CN Office Action dated Feb. 11, 2020. (75 pages).

(56) References Cited

OTHER PUBLICATIONS

Office Action dated Jun. 30, 2020, issued in counterpart CN Application No. 201811155252.6, with English Translation. (10 pages).
Wang, Wanliang et al., "Advances in generative adversarial network", Journal on Communications, Feb. 2018, vol. 39, No. 2, with English Abstract; Cited in CN Office Action dated Jun. 30, 2020. (14 pages).
Salimans, Tim et al., "Improved Techniques for Training GANs", arXiv, Dec. 2016; Cited in CN Office Action dated Jun. 30, 2020. (10 pages).
Office Action dated May 13, 2021, issued in counterpart RU Application No. 2020136214/28, with English Translation. (11 pages).
Issue Notification dated Oct. 13, 2021, issued in counterpart RU Application No. 2020136214/28, with English Translation. (24 pages).
International Search Report dated Jul. 24, 2019, issued in counterpart Application No. PCT/CN2019/083872 (4 pages).
Office Action dated Apr. 26, 2020, issued in counterpart CN Application No. 201811155326.6, with English translation (11 pages).
Office Action dated May 21, 2021, issued in counterpart AU Application No. 2019350918. (4 pages).
Office Action dated May 13, 2021, issued in counterpart RU Application No. 2020136214/28. (6 pages).
Extended (Supplementary) European Search Report dated Jun. 20, 2022, issued in counterpart EP application No. 19850782.4. (8 pages).
Extended (Supplementary) European Search Report dated Jul. 5, 2022, issued in counterpart EP application No. 19850757.6. (9 pages).
Extended (Supplementary) European Search Report dated Jul. 26, 2022, issued in counterpart EP application No. 19850805.3. (9 pages).
Extended (Supplementary) European Search Report dated Aug. 2, 2022, issued in counterpart EP application No. 19864756.2. (8 pages).
Takeki et al., "Parallel Grid Pooling for Data Augmentation", NTT Communications Science Laboratories, 2018, pp. 1-18, cited in EP Extended European Search Report dated Jun. 20, 2022. (18 pages).

\* cited by examiner

| p1 | p2 | p3 |
|----|----|----|
| p4 | p5 | p6 |
| p7 | p8 | p9 |

| p1 | p2 | p3 |
|----|----|----|
| p4 | p5 | p6 |
| p7 | p8 | p9 |

| 0 | p1 | p2 |
|---|----|----|
| 0 | p4 | p5 |
| 0 | p7 | p8 |

| 0 | 0 | p1 |
|---|---|----|
| 0 | 0 | p4 |
| 0 | 0 | p7 |

| 0  | 0  | 0  |
|----|----|----|
| p1 | p2 | p3 |
| p4 | p5 | p6 |

| 0 | 0  | 0  |
|---|----|----|
| 0 | p1 | p2 |
| 0 | p4 | p5 |

| 0 | 0 | 0  |
|---|---|----|
| 0 | 0 | p1 |
| 0 | 0 | p4 |

| 0  | 0  | 0  |
|----|----|----|
| 0  | 0  | 0  |
| p1 | p2 | p3 |

| 0 | 0  | 0  |
|---|----|----|
| 0 | 0  | 0  |
| 0 | p1 | p2 |

| 0 | 0 | 0  |
|---|---|----|
| 0 | 0 | 0  |
| 0 | 0 | p1 |

FIG. 4

APPARATUS AND METHOD FOR IMAGE PROCESSING, AND SYSTEM FOR TRAINING NEURAL NETWORK

CROSS-REFERENCE TO RELATED APPLICATIONS

This application claims benefit of the filing date of each of Chinese Patent Application No. 201811155252.6 filed on Sep. 30, 2018, Chinese Patent Application No. 201811155326.6 filed on Sep. 30, 2018, Chinese Patent Application No. 201811155147.2 filed on Sep. 30, 2018, and Chinese Patent Application No. 201811155930.9 filed on Sep. 30, 2018, the disclosure of each of which is hereby incorporated in its entirety by reference.

TECHNICAL FIELD

The present disclosure generally relates to the field of deep learning technologies, and more particularly, to deep learning-based image processing technology, including an apparatus, method, and computer-readable medium for image processing discriminative network.

BACKGROUND

Deep learning technology on the basis of an artificial neural network has made great progress in such fields as image processing. An advantage of the deep learning technology lies in the solution of different technical problems using an all-purpose structure and a relatively similar system.

BRIEF SUMMARY

An embodiment of the present disclosure is an apparatus for generating a plurality of correlation images. The apparatus may comprise a feature extracting unit configured to receive a training image and extracting at least one or more of feature from the training image to generate a first feature image based on the training image; a normalizer configured to normalize the first feature image and generate a second feature image; and a shift correlating unit configured to perform a plurality of translational shifts on the second feature image to generate a plurality of shifted images, correlate each of the plurality of shifted images with the second feature image to generate the plurality of correlation images.

In at least some embodiments, the shift correlating unit may be configured to perform the plurality of translational shifts on the second feature image by shifting a number of leftmost or rightmost columns of pixels in the pixel block of the second feature image to be the rightmost and leftmost column, respectively, of the pixel block; and shifting b number of bottommost or topmost rows of pixels in the pixel block of the second feature image to be the topmost or bottommost row, respectively, of the pixel block. In at least some embodiments, 0≤a<Y, 0≤b<X, each of a and b being an integer, Y being a total number of columns of pixels in the pixel block of the second feature image, X being a total number of rows of pixels in the pixel block of the second feature image, and a and b being the same or different.

In at least some embodiments, the shift correlating unit may be configured to perform the plurality of translational shifts on the second feature image by shifting a number of leftmost or rightmost columns of pixels in the pixel block of the second feature image to be the rightmost and leftmost column, respectively, of the pixel block; and shifting b number of bottommost or topmost rows of pixels in the pixel block of the second feature image to be the topmost or bottommost row, respectively, of the pixel block. In at least some embodiments, 0≤a<Y, 0≤b<X, each of a and b being an integer, Y being a total number of columns of pixels in the pixel block of the second feature image, X being a total number of rows of pixels in the pixel block of the second feature image, and a and b being the same or different.

In at least some embodiments, the shift correlating unit may be configured to correlate each of the plurality of shifted images with the second feature image by multiplying a pixel value of each pixel in the pixel block of each of the plurality of shifted images with a pixel value of a positionally corresponding pixel in the pixel block of the second feature image. In at least some embodiments, the first feature image may be a luminance feature image. In at least some embodiments, the feature extracting unit may comprise: a luminance detector configured to extract luminance information from the training image to generate the luminance feature image.

In at least some embodiments, to generate the luminance feature image, the luminance detector is configured to determine a luminance value of a pixel at a given position in the luminance feature image according to the following formula (1):

$$I=0.299R+0.587G+0.114B \quad (1)$$

I is the luminance value. R is a red component value of a positionally corresponding pixel in the training image. G is a green component value of the positionally corresponding pixel in the training image. B is a blue component value of the positionally corresponding pixel in the training image.

In at least some embodiments, the normalizer may be configured to normalize the luminance feature image according to the following formula (2):

$$\begin{cases} N = \dfrac{I - \mu}{\sigma - 1} \\ \sigma^2 = \text{Blur}(I^2) - \mu \\ \mu = \text{Blur}(I) \end{cases} \quad (2)$$

N is the first feature image. I represents the luminance value of a pixel at a given position in the luminance feature image. Blur($I^2$) is an image obtained by applying a Gaussian filter to the luminance feature image. Blur($I^2$) is an image obtained by squaring every pixel value in the luminance feature image, and then applying the Gaussian filter to the image.

In at least some embodiments, the second feature image may comprise a pixel block having a first size. Each of the plurality of shifted images and each of the plurality of correlation images may comprise a pixel block having the first size. In each of the plurality of shifted images, a pixel having a non-zero pixel value may have a corresponding pixel with the same non-zero pixel value in the second feature image.

Another embodiment of the present disclosure is a method of generating a plurality of correlation images. The method may comprise: generating a first feature image based on a training image; normalizing the first feature image and generating a second feature image; performing a plurality of translational shifts on the second feature image to generate a plurality of shifted images; and correlating each of the plurality of shifted images with the second feature image to generate a plurality of correlation images.

In at least some embodiments, the correlating of each of the plurality of shifted images with the second feature image may comprise multiplying a pixel value of each pixel in the pixel block of each of the plurality of shifted images with a pixel value of a positionally corresponding pixel in the pixel block of the second feature image.

In at least some embodiments, the performing of the plurality of translational shifts may comprise: shifting a number of leftmost or rightmost columns of pixels in the pixel block of the second feature image to be the rightmost and leftmost column, respectively, of the pixel block; and shifting b number of bottommost or topmost rows of pixels in the pixel block of the second feature image to be the topmost or bottommost row, respectively, of the pixel block. In at least some embodiments, $0 \leq a < Y$, $0 \leq b < X$, each of a and b being an integer, Y being a total number of columns of pixels in the pixel block of the second feature image, X being a total number of rows of pixels in the pixel block of the second feature image, and a and b being the same or different. In at least some embodiments, at least one of a and b may change at least once during the performing of the plurality of translational shifts.

In at least some embodiments, the performing of the plurality of translational shifts may comprise: deleting a number of leftmost or rightmost columns of pixels in the pixel block of the second feature image, and adding a number of columns of pixels at the rightmost or leftmost position, respectively, of the pixel block; and deleting b number of bottommost or topmost rows of pixels in the pixel block of the second feature image, and adding b number of rows at the topmost or bottommost position, respectively, of the pixel block. In at least some embodiments, $0 \leq a < Y$, $0 \leq b < X$, each of a and b being an integer, Y being a total number of columns of pixels in the pixel block of the second feature image, and X being a total number of rows of pixels in the pixel block of the second feature image. In at least some embodiments, each of the added pixels may have a pixel value of 0. In at least some embodiments, at least one of a and b may change at least once during the performing of the plurality of translational shifts.

In at least some embodiments, the method may further comprise performing X*Y translational shifts, Y being a total number of columns of pixels in the pixel block of the second feature image, and X being a total number of rows of pixels in the pixel block of the second feature image.

In at least some embodiments, the method may further comprise, before the generating of the first feature image, receiving the training image. In at least some embodiments, the generating of the first feature image may comprise generating a luminance feature image based on luminance information of the training image.

In at least some embodiments, the method may further comprise determining a luminance value of a pixel at a given position in the luminance feature image according to the following formula (1):

$$I = 0.299R + 0.587G + 0.114B \tag{1}$$

I is the luminance value. R is a red component value of a positionally corresponding pixel in the training image. G is a green component value of the positionally corresponding pixel in the training image. B is a blue component value of the positionally corresponding pixel in the training image.

In at least some embodiments, the method may further comprise normalizing the luminance feature image according to the following formula (2):

$$\begin{cases} N = \dfrac{I - \mu}{\sigma - 1} \\ \sigma^2 = \text{Blur}(I^2) - \mu \\ \mu = \text{Blur}(I) \end{cases} \tag{2}$$

N is the first feature image. I represents the luminance feature image. Blur(I) is an image obtained by applying a Gaussian filter to the luminance feature image. Blur($I^2$) is an image obtained by squaring every pixel value in the luminance feature image, and then applying the Gaussian filter to the image.

In at least some embodiments, the first feature image may comprise a pixel block having a first size. In at least some embodiments, each of the plurality of shifted images and each of the plurality of correlation images may comprise a pixel block having the first size. In at least some embodiments, in each of the plurality of shifted images, a pixel having a non-zero pixel value may have a corresponding pixel with the same non-zero pixel value in the first feature image.

Another embodiment of the present disclosure is a non-transitory computer-readable medium storing instructions that cause a computer to execute a method of generating a plurality of correlation images. The method may be as described above.

Another embodiment of the present disclosure is a system for training a generative adversarial network. The system may comprise a generative adversarial network processor, comprising a generative network microprocessor which is configured to be trained by a discriminative network microprocessor, and the discriminative network microprocessor which is coupled to the generative network.

In at least some embodiments, the discriminate network microprocessor may comprise: a plurality of input terminals coupled to a plurality of apparatuses for generating a plurality of correlation images. Each of the plurality of apparatuses may be as described above; a plurality of analysis modules, each of the plurality of analysis modules being coupled to one of the plurality of input terminals; a plurality of pooling modules connected in cascade, each stage of the cascade comprising a pooling module coupled to one of the plurality of analysis modules and to a pooling module in a previous stage of the cascade; and a discriminator network coupled to the pooling module in a last stage of the cascade.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

FIG. 2 shows a schematic diagram of a 3*3 pixel block in a first feature image according to an embodiment of the present disclosure;

FIG. 3 shows the 3*3 pixel block in each of the nine (9) shifted images obtained by shifting the first feature image illustrated in FIG. 2 according to an embodiment of the present disclosure;

FIG. 4 shows the 3*3 pixel block in each of the nine (9) shifted images obtained by shifting the first feature image illustrated in FIG. 2 according to another embodiment of the present disclosure;

Figure 1:
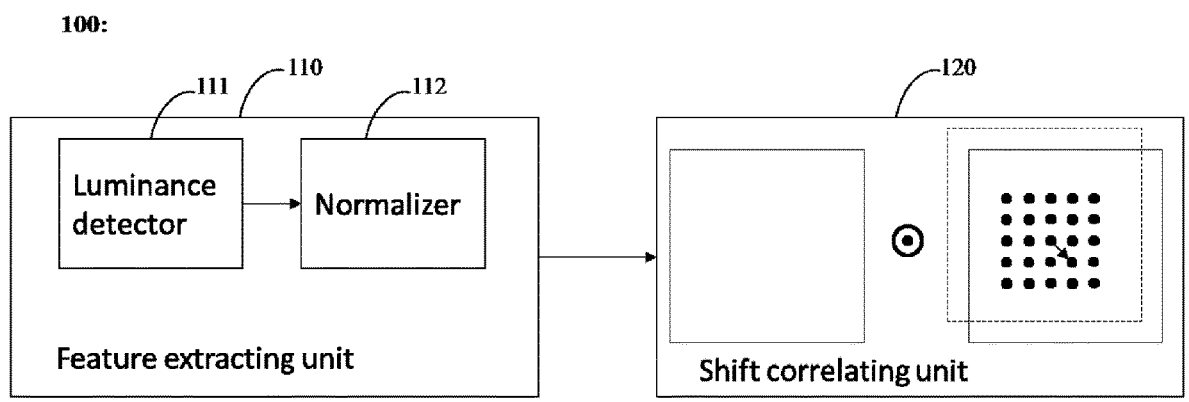
FIG. 1 shows a block diagram of an apparatus for image processing, according to an embodiment of the present disclosure.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Deep learning technology on the basis of an artificial neural network has made great progress in such fields as image processing. Deep learning is a learning method based on characterization of data among machine learning methods. Observed values (such as an image) may be represented in various ways as a vector of intensity values of various pixels, or more abstractly, as a series of edges, an area having a particular shape, et cetera. An advantage of the deep learning technology lies in the solution of different technical problems using an all-purpose structure and a relatively similar system. The benefit of deep learning is to substitute manual acquisition of features with efficient unsupervised or semi-supervised algorithms for feature learning and hierarchical feature extraction.

Images of the natural world may be readily distinguished from images created synthetically by humans or randomly by a computer. Natural images are distinctive at least because they contain particular structure, and are highly non-random. For example, images generated synthetically and randomly by a computer rarely contain a naturalistic scene or object.

Image processing systems such as compression algorithms, analogue storage media, and even humans' own visual systems work on real-world images. Generative adversarial networks (GANs) are one solution for generating realistic samples of natural images. GANs may be an approach to generative modeling where two models are trained simultaneously or cross-trained.

Learning systems can be configured to adjust parameters based on a specific target, represented by a loss function. In a GAN, the loss function is replaced by another machine learning system that can independently learn a difficult task. A GAN generally includes a generative network that is pitted against a discriminative network. The generative network receives an input of a low-resolution data image, upscales the low-resolution data image, and feeds the upscaled image to the discriminative network. The discriminative network is tasked with classifying whether its input is the output of the generative network (i.e., the "fake" upscaled data image) or the actual image (i.e., the original high-resolution data image). The discriminative network outputs a score between "0" and "1", which measures the probability that its input is the upscaled image and the original image. If the discriminative network outputs a score of "0" or approaching "0", then the discriminative network has determined that the image is the output of the generative network. If the discriminative network outputs a number of "1" or approaching "1", then the discriminative network has determined that the image is the original image. This manner of pitting the generative network against the discriminative network—hence, "adversarial"—utilizes competition between the two networks to drive both networks to improve their methods until the images generated by the generative network are indistinguishable from the originals.

The discriminative network may be trained to score an input as "real" or "fake" using data having predetermined scores. The "fake" data may be the high-resolution image generated by the generative network, and the "real" data may be a predetermined reference image. To train the discriminative network, the parameter of the discriminative network is adjusted until the discriminative network outputs a score approaching "1" whenever it receives "real" data, and a score approaching "0" whenever it receives "fake" data. To train the generative network, the parameter of the generative network is adjusted until output of the generative network receives a score as close to "1" as possible from the discriminative network.

A common analogy for GAN is that of a counterfeiter and a police. The generative network can be analogized to the counterfeiter, trying to produce fake currency and use it without detection, whereas the discriminative network can be analogized to the police, trying to detect the fake currency. Competition between the counterfeiter and the police would spur both sides to improve their methods until the counterfeits are indistinguishable from the genuine article.

Both the generative and discriminative networks are trying to optimize a different and opposing objective function, that is, the loss function, in a zero-sum game. Through "cross-training" to maximize the output by the discriminative network, the generative network improves the images it generates, and the discriminative network improves the accuracy in its distinction between the original high-resolution image and the image generated by the generative network. The generative network and the discriminative network compete to generate better images and improve the criteria to evaluate images.

There remains a need to increase the accuracy of the discriminative network in distinguishing between the original high-resolution image and the image generated by the generative network, in order to train the generative network to improve on a particular parameter. For example, there is interest in the task of generating images that are perceived to be real and uncorrupted. This can be applied to problems such as deblurring, denoising, demosaicking, compression removal, contrast enhancement, image super-resolution, et cetera. In such problems, a corrupted image is visually impaired, and a machine learning system may be designed to fix it. However, the target of recovering the original image is often impractical and leads to images that do not look real. GANs are designed to generate "real" images. A typical configuration takes a color output image and uses a machine learning system (e.g. convolutional network) to output a single number that measures how real is the image. This system can improve perceptual quality, but today, the outputs of the adversarial system remain short of being perceived as natural images by a human viewer.

FIG. 1 shows a block diagram of an apparatus for image processing, according to an embodiment of the present disclosure.

The block diagram of FIG. 1 is not intended to indicate that the apparatus 100 includes only the components shown in FIG. 1. Rather, the apparatus 100 can include any number of additional accessories and/or components known to a person of ordinary skill in the art, but that are not shown in FIG. 1, depending on the details of the specific implementations.

As shown in FIG. 1, the apparatus 100 comprises a feature extracting unit 110 and a shift correlating unit 120.

The feature extracting unit 110 is configured to extract one or more feature from the training image that is input into or received by the apparatus 100, and generate a feature image based on the extracted feature(s). The feature image represents one or more feature of the training image. The training image may be an image generated by the generative network, or a predetermined reference image.

In some embodiments, as shown in FIG. 1, the feature extracting unit 110 may comprise a luminance detector 111.

The luminance detector 111 is configured to generate a first feature image, for example, of a training image, by extracting from the training image information relating to the luminance in the training image. The first feature image may therefore also be referred to as a luminance feature image.

In some embodiments, as shown in FIG. 1, the feature extracting unit 110 may comprise a normalizer 112.

The normalizer 112 is configured to generate a second feature image by normalizing the first feature image. In embodiments where the first feature image is the luminance feature image, the normalizer 112 is configured to normalize the luminance feature image. Normalization brings the pixel values of an image within a smaller range of values, which can eliminate outlier pixel values that are too high or too low. This can in turn facilitate the calculations of correlations, to be discussed below.

The apparatus 100 for image processing according to the present disclosure may be implemented on a computing device in the form on a general-purpose computer, a microprocessor, in digital electronic circuitry, integrated circuitry, specially designed ASICs (application specific integrated circuits), computer hardware, firmware, software, and/or combinations thereof.

The second feature image generated by the feature extracting unit 110 is output to the shift correlating unit 120 for further processing. The shift correlating unit 120 is configured to perform a plurality of translational shifts of the second feature image to generate a plurality of shifted images. The shift correlating unit 120 is further configured to generate a plurality of correlation images based on a set of correlations between the second feature image and each of the plurality of shifted images. The shift correlating unit 120 is further configured to transmit the plurality of correlation images to a deep learning network for training the network For example, in some embodiments, the plurality of correlation images may be transmitted to a discriminative network in a generative adversarial network to train the discriminative network iteratively with a generative network in the generative adversarial network.

The second feature image has a pixel block of a first size defined by a first number of rows of pixels and a first number of columns of pixels. The second feature image occupies a first area corresponding to the first size prior to the plurality of translation shifts. A translational shift may be accomplished in a number of ways. In some embodiments, a translational shift moves pixels in the second feature image in a row (or horizontal) direction or a column (or vertical) direction from the initial area. In some embodiments, a translational shift may comprise deleting rows and/or columns of pixels that are shifted out of the first area, and assigning a value of "0" to pixels in the space vacated by the shifted pixels. In some embodiments, a translational shift may comprise reordering or rearranging rows and/or columns of pixels.

Each of the plurality of shifted images has a pixel block of the same size as the first size of the pixel block in the second feature image. Each of the plurality of shifted images has the same number of rows of pixels and the same number of columns of pixels as in the second feature image.

Each pixel having a non-zero value in each shifted image has a corresponding pixel with the same non-zero value in the second feature image. In at least some embodiments, pixels that do not have a corresponding pixel in the second feature image are assigned a value of "0". As an illustrative example, the values of pixels in the first two rows of a shifted image may be identical to the values of respectively corresponding pixels in the last two rows of the first feature image, and all other pixels in the shifted image are assigned a value of "0". Each pixel in a shifted image that has a corresponding pixel in the second feature image has the same pixel value as the corresponding pixel.

In the present disclosure, "corresponding pixels" are not limited to pixels that correspond in position, but may also include pixels that occupy different positions. "Corresponding pixels" refer to pixels that have the same pixel values.

In the present disclosure, images are processed as pixel blocks. The value of a pixel in a block represents the value of the pixel in the image that corresponds in position to the pixel in the block.

The correlation between two images may be calculated by a pixel-to-pixel multiplication of the pixel blocks of the two images. For instance, the value of the pixel at the $i^{th}$ row and $j^{th}$ column $(i, j)$ of a correlation image may be determined by multiplying the value of the pixel at the $(i, j)$ position in the second feature image by the value of the pixel at the $(i, j)$ position in a corresponding shifted image.

As shown in FIG. 1, in some embodiments, the feature extracting unit 110 comprises a luminance detector 111 and a normalizer 112.

The luminance detector 111 is configured to generate a first feature image by extracting, for example, from a training image received by the feature extracting unit 110, information relating to the luminance in the training image, and to generate a luminance feature image based on the extracted luminance information. The first feature image may therefore also be referred to as a luminance feature image. Human eyes tend to be more sensitive to the luminance of an image than to other features. By extracting the luminance information, the apparatus of the present disclosure eliminates unnecessary information from the training image, which can reduce the processing load.

The numbers of rows and columns of pixels in the luminance feature image are the same as in the training image. The luminance value I of a pixel at $i^{th}$ row and $j^{th}$ column (i, j) of the luminance feature image may be calculated according to the following formula (1):

$$I = 0.299R + 0.587G + 0.114B \qquad (1)$$

In formula (1), R represents the red component value of the pixel (i, j) in the training image. G represents the green component value. B represents the blue component value. Both i and j are integers. The value of i is $1 \leq i \leq X$. The value of j is $1 \leq j \leq Y$. X is the total number of rows in the training image, and Y is the total number of columns in the training image.

In some embodiments, the training image is a color image. In some embodiments, the training image has a R component, a G component, and a B component, and the apparatus of the present disclosure may be configured to process the training image so that the R component, the G component, and the B component are input into the luminance detector, converted into a Y component, a U component, and a V component, respectively, therein, and then respectively input into the Y channel, the U channel, and the V channel, respectively. The Y component, the U component, and the V component are components of the training image in a YUV space. The Y channel, the U channel, and the V channel denote that outputs from these channels are a Y component output, a U component output, and a V component output, respectively. In embodiments where the RGB components of the training image are converted into the YUV components, the luminance value I corresponds to the value of the Y component.

In some embodiments, the training image has a Y component, a U component, and a V component. In that case, the apparatus of the present disclosure may be configured to process a Y component of the training image through a Y channel of the luminance detector; a U component of the training image through a U channel of the luminance detector; and a V component of the training image through a V channel of the luminance detector.

In some embodiments, using the YUV space is performing a chroma sampling on the training image. The Y component of the training image enters Y channel. The U component of the training image enters U channel. The V component of the training image enters V channel. By separating input signal of the training image into three groups, a respective channel processing signal in a component from a group of the Y component, the U component, and the V component, may reduce the computation burden and enhance the processing speeding. The U component and the V component has a relative low impact on the display effect of an image, so processing different components in different channels will not have significant effect on the image display.

The normalizer 112 is configured to generate a second feature image by normalizing the first feature image. In embodiments where the feature extracting unit 110 comprises the luminance detector 111 and the first feature image is the luminance feature image, the normalizer 112 is configured to normalize the luminance feature image. Normalization brings the pixel values of an image within a smaller range of values, which can eliminate outlier pixel values that are too high or too low. This can in turn facilitate the calculations of correlations.

More particularly, the normalizer 112 is configured to perform normalization according to the following formula (2) to obtain the second feature image:

$$\begin{cases} N = \dfrac{I - \mu}{\sigma - 1} \\ \sigma^2 = \text{Blur}\,(I^2) - \mu \\ \mu = \text{Blur}\,(I) \end{cases} \qquad (2)$$

In formula (2), N represents the second feature image. I represents the luminance feature image obtained from the training image. Blur represents the Gaussian blur. Blur(I) represents Gaussian blur filter implemented on the luminance feature image. Blur($I^2$) represents the image obtained by squaring every pixel value in the luminance feature image, and then implementing Gaussian blur filter on the image. μ represents an output image obtained using the Gaussian blur filter. $\sigma^2$ presents a local variance normalized image.

In some embodiments of the present disclosure, a translational shift of the second feature image comprises shifting the last a columns of pixels in the second feature image to the front of the remaining columns of pixels to obtain an intermediate image. The last b rows of pixels in the intermediate image are then shifted to the front of the remaining rows of pixels to obtain a shifted image. The value of a is $0 \leq a < Y$. The value of b is $0 \leq b < X$. Both a and b are integers. X represents the total number of rows of pixels in the second feature image. Y represents the total number of columns of pixels in the second feature image. The values of a and b may be the same or different. When a and b are both zero, the shifted image is the second feature image. In some embodiments, in any given two image shifting processes, the value of at least one of a and b changes. It is understood that the order in which the shifts are performed is not particularly limited. For example, in some embodiments, rows of pixels may be shifted to obtain the intermediate image, and then columns of pixels may be shifted to obtain the shifted image.

The value of each pixel in the shifted image corresponds to the value of a pixel in the second feature image. The value of pixel (i, j) in each of the plurality of shifted images originates from a different pixel at a different position in the second feature image.

In some embodiments, a translational shift of the first feature image comprises shifting the last b rows of pixels in the second feature image to the front of the remaining rows of pixels to obtain an intermediate image. The last a rows of pixels in the intermediate image are then shifted to the front of the remaining rows of pixels to obtain a shifted image.

In some embodiments, X*Y number of translational shifts are performed on the second feature image to obtain X*Y number of correlation images. Even when a and b are both zero, this counts as one translational shift.

The block diagram of FIG. 1 is not intended to indicate that the apparatus 100 includes only the components shown in FIG. 1. Rather, the apparatus 100 can include any number of additional accessories and/or components known to a person of ordinary skill in the art, but that are not shown in FIG. 1, depending on the details of the specific implementations.

Figure 2:
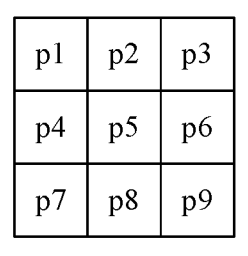
Figure 3:
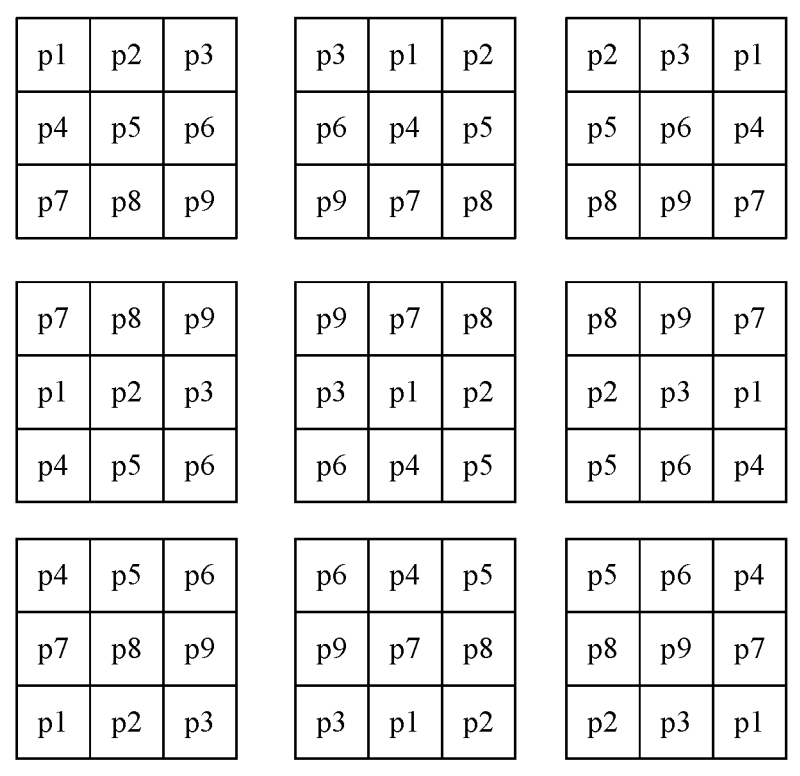

FIG. 2 shows a schematic diagram of a 3*3 pixel block in a second feature image according to an embodiment of the present disclosure. In FIG. 2, "p1" . . . "p9" each represents the value of one of the nine (9) pixels. FIG. 3 shows the 3*3 pixel block in each of the nine (9) shifted images obtained by shifting the second feature image illustrated in FIG. 2 according to an embodiment of the present disclosure.

In embodiments of the present disclosure, the second feature image comprises a pixel block having a first size. Each of the plurality of shifted images and each of the plurality of correlation images comprises a pixel block having the first size.

For purpose of the present disclosure, the topmost row of pixels in the block illustrated in FIG. 2 is the first row, and the leftmost column of pixels in the block illustrated in FIG. 2 is the first column. If a=1 and b=1, then to obtain the shifted image shown in the middle of the second row in FIG. 3, the last column (i.e., the rightmost column) of pixels in the second feature image is moved to the front of the first column (i.e., the leftmost column) of pixels, and the last row (i.e., the bottom row) of pixels is moved to the front of the first row (i.e., the top row) of pixels.

In the embodiments illustrated in FIGS. 2 and 3, a pixel can occupy one of nine (9) positions in the block, and the possibility that each pixel appears at each of the nine (9) positions is reflected in the nine (9) shifted images. Subsequently, the nine (9) correlation images contain information not only about each pixel's correlation not only with itself, but also about each pixel's correlation with the other pixels in the image. In the illustrative example of a generative adversarial network, if the generative network generates an image in which the value of one pixel differs from the high-resolution original ("real") image, then every correlation image obtained based on the synthetically generated image will show a discrepancy with the correlation image of the high-resolution original image. This discrepancy will prompt the discriminative network to score the synthetically generated image closer to "0" (i.e., a "fake" classification), which will drive the generative network to update and improve on generating an output that is more realistic and perceptually more convincing.

It is understood that the present disclosure does not limit the translational shifts that may be applied to an image. FIG. 4 shows the 3*3 pixel block in each of the nine (9) shifted images obtained after shifting the second feature image illustrated in FIG. 2 according to another embodiment of the present disclosure.

In FIGS. 2 and 4, the last a columns of pixels in the second feature image are removed, and a columns of pixels are added to the front of the remaining columns of pixels to obtain an intermediate image. Each pixel in the added a columns has a value of "0". Next, in the intermediate image, the last b rows of pixels are removed, and b rows of pixels are added to the front of the remaining rows of pixels to obtain a shifted image. Each pixel in the added b columns has a value of "0". More particularly, $0 \le a < Y$, $0 \le b < X$, a and b both being integers. X represents the total number of rows of pixels in the second feature image. Y represents the total number of columns of pixels in the second feature image. The values of a and b may be the same or different. In some embodiments, in any given two image shifting processes, the value of at least one of a and b changes.

The shift correlating unit 120 is configured to generate a correlation image by multiplying the values of pixels at corresponding positions in two images. In a correlation image, the value of pixel at the (i, j) position is obtained by multiplying the value of pixel (i, j) in the second feature image and the value of pixel (i, j) in the shifted image. The value of i is $1 \le i \le X$. The value of j is $1 \le j \le Y$. Both i and j are integers. X represents the total number of rows of pixels in the second feature image. Y represents the total number of columns of pixels in the second feature image.

The apparatus 100 for image processing according to the present disclosure may be implemented on a computing device in the form on a general-purpose computer, a microprocessor, in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the apparatuses, systems, processes, functionalities, and techniques described here can be implemented on a computer having a display device (e.g., a CRT (cathode ray tube) or LCD (liquid crystal display) monitor) for displaying information to the user, and a keyboard and a pointing device (e.g., a mouse or a trackball) by which the user can provide input to the computer. Other kinds of accessories and/or devices can be used to provide for interaction with a user as well, including, for example, feedback provided to the user can be any form of sensory feedback (e.g., visual feedback, auditory feedback, or tactile feedback). Input from the user can be received in any form, including acoustic, speech, or tactile input.

The apparatuses, systems, processes, functionalities, and techniques described above can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the apparatuses, systems, processes, functionalities, and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The apparatus according to the present disclosure for image processing may be coupled to neural networks, and may be configured to train the neural networks. In some embodiments, the apparatus according to the present disclosure is configured to train a generative adversarial network (GAN). The GAN may comprise a generative network and a discriminative network.

Figure 5:
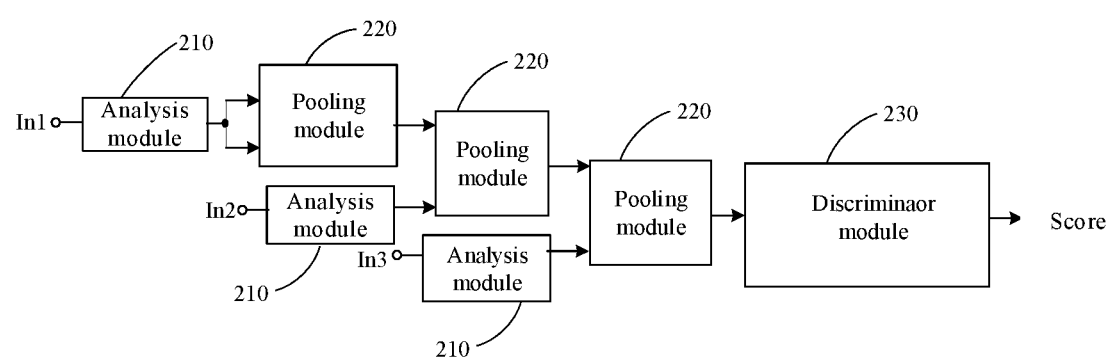
FIG. 5 shows a discriminative network according to an embodiment of the present disclosure, which discriminative network may be coupled to an apparatus for image processing according to the present disclosure.

The discriminative network may be constructed and configured in any appropriate manner known to a person of ordinary skill in the art, so long as the discriminative network is capable of classifying the degree of match between the image it receives as input and the predetermined reference image having the same resolution as the input image. FIG. 5 shows a discriminative network 200 according to an embodiment of the present disclosure. The discriminative network 200 may comprise a plurality of input terminals In1, In2, In 3, a plurality of analysis modules 210, a plurality of pooling modules 220, and a discriminator module 230.

Each of the plurality of analysis modules 210 is coupled to a corresponding one of the plurality of input terminals In1, In2, In3. The analysis modules 210 receive, through the input terminals In1, In2, In3, the plurality of correlation images generated by an apparatus according to the present disclosure. The analysis modules 210 are configured to generate, based on the plurality of correlation images, a corresponding plurality of third feature images. Each of the plurality of third feature images is a multi-channel image that represents the different dimensions of the corresponding correlation image. Each of the plurality of third feature images has a larger number of channels than the corresponding correlation image. For example, the input correlation image may have 3 channels, and the output third feature image may have 64 channels, 128 channels, or some other arbitrary number of channels. Each of the plurality of third feature images is generated with the same resolution as the corresponding correlation image.

Each of the plurality of analysis modules 210 is coupled to one of the plurality of pooling modules 220. The plurality of pooling modules 220 are connected in cascade. The pooling modules 220 are configured to receive a plurality of input images, generate a composite image by concatenating the plurality of input images, and reduce the resolution of the composite image to generate a downscaled composite image. More particularly, the plurality of input images includes a third feature image received from the corresponding analysis module 210, and a reference image. As shown in FIG. 5, in the first stage of the cascade, the third feature image from the analysis module 210 doubles as the reference image for the corresponding pooling module 220. In the subsequent stages of the cascade, the reference image is the downscaled composite image generated by the pooling module 220 in the previous stage of the cascade.

The discriminator module 230 is configured to receive the downscaled composite image from the pooling module 220 in the last stage of the cascade, classify the received downscaled composite image by generating a score that represents a degree of match between the received image and a predetermined reference image having the same resolution as the received image.

The generative network may be constructed and configured in any appropriate manner known to a person of ordinary skill in the art, so long as the generative network is capable of upscaling and generating an image.

The apparatus 100 may be coupled to the discriminative network via an input terminal of the discriminative network. The discriminative network may not receive directly an output image from the generative network, or the high-resolution original sample image. Rather, the discriminative network may be configured to receive, classify, and score the output image from the generative network, or the high-resolution original sample image, after they have been preprocessed by the apparatus 100. In other words, the discriminative network may be configured to receive, classify, and score the output from the apparatus 100.

Conventional methods of training a GAN feed the output image from the generative network or the original sample image directly to the discriminative network for classification. As a result, for purpose of classify the discriminative network is limited to relying on information that is in the output image or the original sample image.

In the apparatus according to the present disclosure for image processing, the shift correlating unit processes the output image from the generative network and/or the high-resolution original image to generate a plurality of correlation images. For example, the shift correlating unit is configured to generate a plurality of correlation images that contain not only information inherent to the output image and/or the original sample image, but also information relating to the correlations between those images and shifted or otherwise transformed images. Compared to conventional methods, the discriminative network in the system of the present disclosure is provided with additional information with which to make a classification, for example, by comparing the set of correlations between the output image from the generative network and the transformed images with the set of correlations between the original sample image and the transformed images. Further, from the Naturalness Image Quality Evaluator (NIQE) no-reference image quality score, it is believed that correlations between the output image (or the original sample image) and the transformed images affect perceptual quality.

Compared to conventional methods, classification based on output from the apparatus of the present disclosure for image processing increases the precision of the classification, improves the accuracy of the classification result, and trains the parameters of the generative network toward creating solutions that are highly similar to real images and thus difficult to classify by the discriminative network. This encourages perceptually superior solutions.

Figure 6:
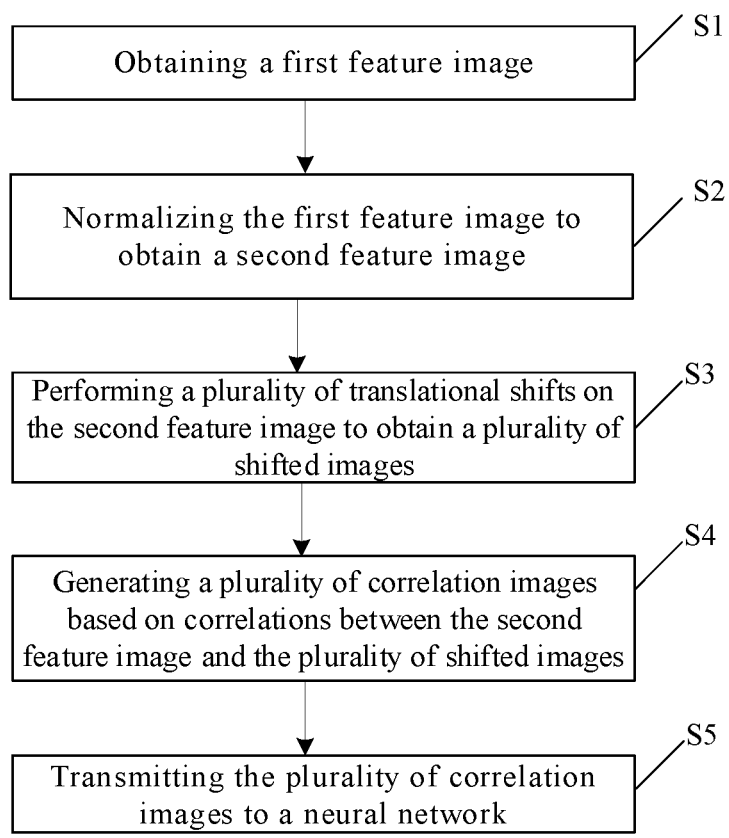
FIG. 6 shows a flow chart of a method for image processing according to an embodiment of the present disclosure.

The present disclosure also provides a method for image processing. FIG. 6 shows a flow chart of a method for image processing according to an embodiment of the present disclosure.

Step S1 comprises obtaining a first feature image, for example, by generating a luminance feature image based on extracted luminance information of a training image.

Step S2 comprises normalizing the first feature image to obtain a second feature image.

Step S3 comprises performing a plurality of translational shifts on the second feature image to obtain a plurality of shifted images. Each shifted image has the same numbers of rows and columns of pixels as in the second feature image.

Each pixel having a non-zero value in each shifted image has a corresponding pixel with the same non-zero value in the second feature image. Pixels that do not have a corresponding pixel in the second feature image may be assigned a value of "0". In other words, each pixel having a non-zero value in a shifted image has a corresponding pixel in the second feature image.

Step S4 comprises generating a plurality of correlation images based on the correlations between the second feature image and the plurality of shifted images. Each correlation image has the same number of rows and columns of pixels as the second feature image.

Step S5 comprises transmitting the plurality of correlation images to a neural network, for example, the discriminative network of a generative adversarial network.

The method according to the present disclosure may be configured to train neural networks. In some embodiments, the method according to the present disclosure is configured to train a generative adversarial network (GAN). The GAN may comprise a generative network and a discriminative network. Conventional methods of training a GAN feed the output image from the generative network or the original sample image directly to the discriminative network for classification. As a result, for purpose of classify the discriminative network is limited to relying on information that is in the output image or the original sample image.

Compared to conventional techniques, the method of the present disclosure does not transmit output image from the generative network or the high-resolution original image directly to the discriminative network. Rather, images are processed by an apparatus described above, which includes a feature extracting unit and a shift correlation unit, before being fed to the discriminative network for classification. The shift correlation unit generates a plurality of transformed images. For example, the shift correlating unit is configured to generate a plurality of correlation images, which contain not only information inherent to the output image and the original sample image, but also information relating to the correlations between those images and the transformed images. This additional information allows the discriminative network to make a classification based on the similarity between the two sets of correlations, namely, the set of correlations between the output image from the generative network and the transformed images, and the other set of correlations between the original sample image and the transformed images. Further, from the Naturalness Image Quality Evaluator (NIQE) no-reference image quality score, it is believed that correlations between the output image (or the original sample image) and the transformed images affect perceptual quality.

Classification based on output from the apparatus of the present disclosure increases the precision of the classification, improves the accuracy of the classification result, and trains the parameters of the generative network toward creating solutions that are highly similar to real images and thus difficult to classify by the discriminative network. This encourages perceptually superior solutions.

Figure 7:
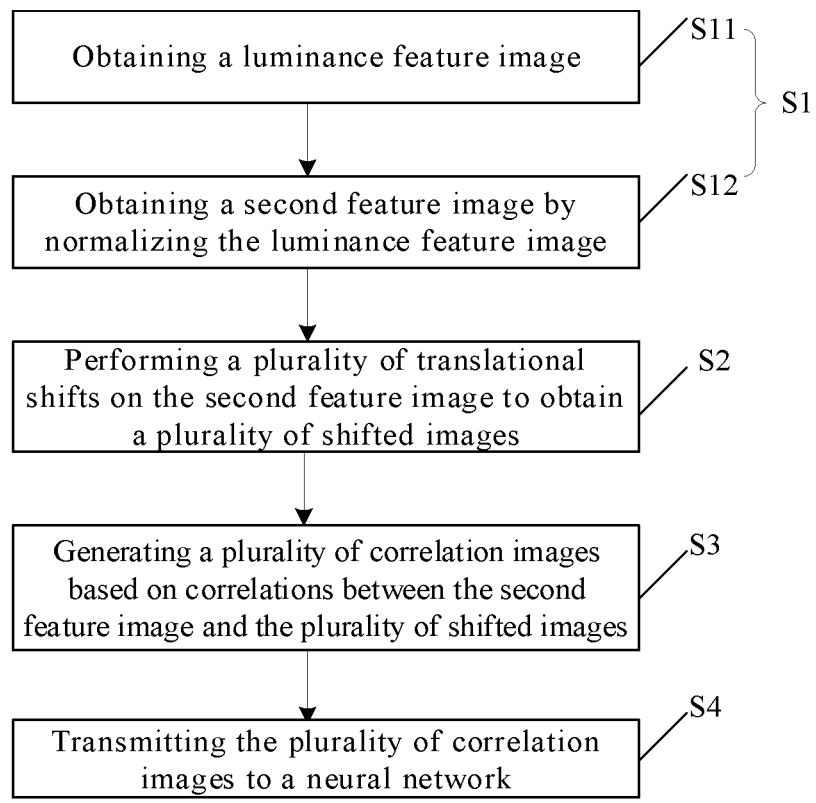
FIG. 7 shows a flow chart of a method for image processing according to another embodiment of the present disclosure.

FIG. 7 shows a flow chart of a method for image processing according to another embodiment of the present disclosure.

Step S1 comprises obtaining a first feature image. The first feature image may be a luminance feature image obtained by extracting luminance information of a training image.

The obtaining of the first feature image may therefore comprise step S11, which comprises obtaining a luminance feature image based on the luminance information in the training image.

The luminance feature image has the same numbers of rows and columns of pixels as in the training image. The luminance value I of a pixel at $i^{th}$ row and $j^{th}$ column (i, j) of the luminance feature image may be calculated according to the following formula (1):

$$I = 0.299R + 0.587G + 0.114B \qquad (1)$$

In formula (1), R represents the red component value of the pixel (i, j) in the training image. G represents the green component value. B represents the blue component value. Both i and j are integers. The value of i is $1 \leq i \leq X$. The value of j is $1 \leq j \leq Y$. X is the total number of rows in the training image, and Y is the total number of columns in the training image.

In step S12, the luminance feature image is normalized to obtain the second feature image. Normalization brings the pixel values of an image within a smaller range of values, which can eliminate outlier pixel values that are too high or too low. This can in turn facilitate the calculations of correlations.

More particularly, in step S12, normalization is performed according to the following formula (2):

$$\begin{cases} N = \dfrac{I - \mu}{\sigma - 1} \\ \sigma^2 = \mathrm{Blur}\,(I^2) - \mu \\ \mu = \mathrm{Blur}\,(I) \end{cases} \qquad (2)$$

In formula (2), N represents the second feature image. I represents the luminance value of a pixel at a given position in the luminance feature image obtained from the training image. Blur represents the Gaussian blur. Blur(I) represents Gaussian blur filter implemented on the luminance feature image. Blur($I^2$) represents the image obtained by squaring every pixel value in the luminance feature image, and then implementing Gaussian blur filter on the image. μ represents an output image obtained using the Gaussian blur filter. $\sigma^2$ presents a local variance image.

Step S2 comprises performing a plurality of translational shifts on the second feature image to obtain a plurality of shifted images. Each shifted image has the same numbers of rows and columns of pixels as in the second feature image.

In some embodiments of the present disclosure, the performing of the plurality of translational shifts comprises shifting the last a columns of pixels in the second feature image to the front of the remaining columns of pixels to obtain an intermediate image, and then shifting the last b rows of pixels in the intermediate image to the front of the remaining rows of pixels to obtain a shifted image.

In other embodiments of the present disclosure, the performing of the plurality of translational shifts comprises shifting the last b rows of pixels in the second feature image to the front of the remaining rows of pixels to obtain an intermediate image, and then shifting the last a rows of pixels in the intermediate image to the front of the remaining rows of pixels to obtain a shifted image.

The value of a is $0 \leq a < Y$. The value of b is $0 \leq b < X$. Both a and b are integers. X represents the total number of rows of pixels in the second feature image. Y represents the total number of columns of pixels in the second feature image. In some embodiments, in any given two image shifting processes, the value of at least one of a and b changes.

Each pixel having a non-zero value in each shifted image has a corresponding pixel with the same non-zero value in the second feature image. Pixels that do not have a corresponding pixel in the second feature image may be assigned a value of "0". In other words, each pixel having a non-zero value in a shifted image has a corresponding pixel in the second feature image.

Step S3 comprises generating a plurality of correlation images based on the correlations between the second feature image and the plurality of shifted images. Each correlation image has the same number of rows and columns of pixels as the second feature image.

The generating of the plurality of correlation images comprises multiplying the value of each pixel in the second feature image and the value of the positionally corresponding pixel in the shifted image. In other words, the value of pixel (i, j) in the second feature image is multiplied by the value of pixel (i, j) in the shifted image to generate the value of the pixel at the (i, j) position in the correlation image. The value of i is $1 \leq i \leq X$. The value of j is $1 \leq j \leq Y$. Both i and j are integers. X represents the total number of rows of pixels in the second feature image. Y represents the total number of columns of pixels in the second feature image.

Step S4 comprises transmitting the plurality of correlation images to a neural network, for example, the discriminative network of a generative adversarial network.

The method for image processing according to the present disclosure may be implemented on a computing device in the form on a general-purpose computer, a microprocessor, in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Figure 8:
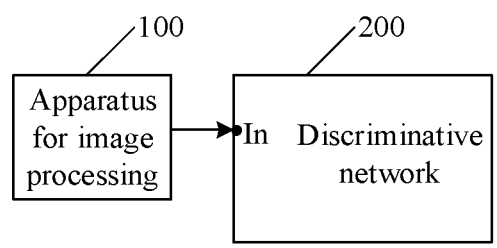
FIG. 8 shows a block diagram of a system according to embodiment of the present disclosure for training a neural network.

FIG. 8 shows a block diagram of a system according to an embodiment of the present disclosure for training a neural work.

As shown in FIG. 8, the apparatus 100 described above may be coupled to a discriminative network 200 via an input terminal In. The structure and configuration of the discriminative network 200 are not particularly limited. The discriminative network 200 may be constructed and configured as described above, or may be constructed and configured in any appropriate manner known to a person of ordinary skill in the art, so long as the discriminative network is capable of classifying the degree of match between the image it receives as input and the predetermined reference image having the same resolution as the input image.

Embodiments of the present disclosure do not transmit output image from the generative network and/or the high-resolution original image directly to the discriminative network. Rather, images are processed, for example, by an apparatus described above comprising a feature extracting unit and a shift correlation unit, before being fed to the discriminative network for classification. The shift correlating unit is configured to process the output image from the generative network and/or the high-resolution original image to generate a plurality of transformed images. For example, the shift correlating unit is configured to generate a plurality of correlation images, which contain not only information inherent to the output image and the original sample image, but also information relating to the correlations between those images and the transformed images. This additional information allows the discriminative network to make a classification based on the similarity between the two sets of correlations, namely, the set of correlations between the output image from the generative and the transformed images, and the other set of correlations between the original sample image and the transformed images. Further, from the Naturalness Image Quality Evaluator (NIQE) no-reference image quality score, it is believed that correlations between the output image (or the original sample image) and the transformed images affect perceptual quality.

Classification based on output from the apparatus according to the present disclosure increases the precision of the classification, improves the accuracy of the classification result, and trains the parameters of the generative network toward creating solutions that are highly similar to real images and thus difficult to classify by the discriminative network. This encourages perceptually superior solutions.

In some embodiments, the apparatus according to the present disclosure may be configured to train a generative adversarial network, for example, as shown in FIG. 8. FIG. 8 shows a system for training a generative adversarial network according to an embodiment of the present disclosure, which comprises one apparatus 100 coupled to a discriminative work 200 via one input terminal In. However, the present disclosure is not limited to the embodiment shown in FIG. 8. The discriminative network may comprise a plurality of input terminals In, each coupled to an apparatus 100, for example, in embodiments where the generative network generates a plurality of images having different resolutions. Each image from the generative network is transmitted to one of the plurality of apparatuses 100 for image processing. Each apparatus 100 generates a plurality of correlation images based on the received image, and transmits the plurality of correlation images to the discriminative network 200. The plurality of correlation images from one apparatus 100 may represent the feature image of the image to be classified for a particular channel The discriminative network 200 is configured to receive the correlation images from the plurality of apparatuses 100 via the plurality of input terminals, and setting the image from the generative network with the highest resolution as the image to be classified, the discriminative network 200 is then configured to score the degree of match between the image to be classified and the predetermined reference image having the same resolution.

The block diagram of FIG. 8 is not intended to indicate that the discriminative network includes only the components shown in FIG. 8. The discriminative network according to the present disclosure may include any number of additional accessories and/or components known to a person of ordinary skill in the art, but not shown in FIG. 8, depending on the details of the specific implementation.

The present disclosure also provides a computer-readable medium that stores the instructions for performing the method of preprocessing image for training a generative adversarial network, as described above.

As used herein, the term "computer-readable medium" refers to any computer program product, apparatus and/or device (e.g., magnetic discs, optical disks, memory, Programmable Logic Devices (PLDs) used to provide machine instructions and/or data to a programmable processor, including a machine readable medium that receives machine instructions as a machine-readable signal. The term "machine-readable signal" refers to any signal used to provide machine instructions and/or data to a programmable processor. The computer-readable medium according to the present disclosure includes, but is not limited to, random access memory (RAM), a read-only memory (ROM), a non-volatile random access memory (NVRAM), a programmable read-only memory (PROM), erasable programmable read-only memory (EPROM), electrically erasable PROM (EEPROM), flash memory, magnetic or optical data storage, registers, disk or tape, such as compact disk (CD) or DVD (digital versatile disc) optical storage media and other non-transitory media.

In the description of the specification, references made to the term "some embodiment," "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples. In addition, for a person of ordinary skill in the art, the disclosure relates to the scope of the present disclosure, and the technical scheme is not limited to the specific combination of the technical features, and also should cover other technical schemes which are formed by combining the technical features or the equivalent features of the technical features without departing from the inventive concept. What is more, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A system for training a generative adversarial network, comprising
   a generative adversarial network processor, comprising a generative network microprocessor which is configured to be trained by a discriminative network microprocessor, and the discriminative network microprocessor which is coupled to the generative network,
   wherein a plurality of input terminals are coupled to a plurality of apparatuses, and each of the apparatuses is configured to generate a plurality of correlation images and includes:
     a feature extracting unit configured to receive a training image and extracting at least one or more of feature from the training image to generate a first feature image based on the training image;
     a normalizer configured to normalize the first feature image and generate a second feature image; and
     a shift correlating unit configured to perform a plurality of translational shifts on the second feature image to generate a plurality of shifted images, correlate each of the plurality of shifted images with the second feature image to generate the plurality of correlation images; and
   wherein the discriminative network microprocessor comprises:
     the plurality of input terminals coupled to the plurality of apparatuses;
     a plurality of analysis modules, each of the plurality of analysis modules being coupled to one of the plurality of input terminals;
     a plurality of pooling modules connected in cascade, each stage of the cascade comprising a pooling module coupled to one of the plurality of analysis modules and to a pooling module in a previous stage of the cascade; and
     a discriminator network coupled to the pooling module in a last stage of the cascade.

2. The system according to claim 1,
   wherein the shift correlating unit is configured to perform the plurality of translational shifts on the second feature image by shifting a number of leftmost or rightmost columns of pixels in a pixel block of the second feature image to be the rightmost and leftmost column, respectively, of the pixel block; and shifting b number of bottommost or topmost rows of pixels in the pixel block of the second feature image to be the topmost or bottommost row, respectively, of the pixel block,
   wherein $0 \leq a < Y$, $0 \leq b < X$, each of a and b being an integer, Y being a total number of columns of pixels in the pixel block of the second feature image, and X being a total number of rows of pixels in the pixel block of the second feature image, and
   wherein a and b may be the same or different.

3. The system according to claim 1,
   wherein the shift correlating unit is configured to correlate each of the plurality of shifted images with the second feature image by multiplying a pixel value of each pixel in a pixel block of each of the plurality of shifted images with a pixel value of a positionally corresponding pixel in the pixel block of the second feature image.

4. The system according to claim 1,
   wherein the first feature image is a luminance feature image, and
   wherein the feature extracting unit comprises:
     a luminance detector configured to extract luminance information from the training image to generate the luminance feature image.

5. The system according to claim 4,
wherein to generate the luminance feature image, the luminance detector is configured to determine a luminance value of a pixel at a given position in the luminance feature image according to the following formula (1):

$$I = 0.299R + 0.587G + 0.114B \quad (1)$$

wherein:
I is the luminance value,
R is a red component value of a positionally corresponding pixel in the training image,
G is a green component value of the positionally corresponding pixel in the training image, and
B is a blue component value of the positionally corresponding pixel in the training image.

6. The system according to claim 4,
wherein the normalizer is configured to normalize the luminance feature image according to the following formula (2):

$$\begin{cases} N = \dfrac{I - \mu}{\sigma - 1} \\ \sigma^2 = \text{Blur}(I^2) - \mu \\ \mu = \text{Blur}(I) \end{cases}$$

wherein:
N is the first feature image,
I represents the luminance value of a pixel at a given position in the luminance feature image,
Blur(I) is an image obtained by applying a Gaussian filter to the luminance feature image, and
Blur($I^2$) is an image obtained by squaring every pixel value in the luminance feature image, and then applying the Gaussian filter to the image.

7. The system according to claim 1,
wherein the second feature image comprises a pixel block having a first size,
wherein each of the plurality of shifted images and each of the plurality of correlation images comprises a pixel block having the first size, and
wherein in each of the plurality of shifted images, a pixel having a non-zero pixel value has a corresponding pixel with the same non-zero pixel value in the second feature image.

8. A method of training a generative adversarial network, the method comprising:
generating a first feature image based on a training image;
normalizing the first feature image and generating a second feature image;
performing a plurality of translational shifts on the second feature image to generate a plurality of shifted images;
correlating each of the plurality of shifted images with the second feature image to generate a plurality of correlation images; and
transmitting the plurality of correlation images to a system for training the generative adversarial network;
wherein the system includes a generative adversarial network processor, comprising a generative network microprocessor which is configured to be trained by a discriminative network microprocessor, and the discriminative network microprocessor which is coupled to the generative network;
wherein the discriminative network microprocessor comprises:

a plurality of input terminals for receiving the plurality of correlation images;
a plurality of analysis modules, each of the plurality of analysis modules being coupled to one of the plurality of input terminals;
a plurality of pooling modules connected in cascade, each stage of the cascade comprising a pooling module coupled to one of the plurality of analysis modules and to a pooling module in a previous stage of the cascade; and
a discriminator network coupled to the pooling module in a last stage of the cascade.

9. The method according to claim 8,
wherein the correlating of each of the plurality of shifted images with the second feature image comprises multiplying a pixel value of each pixel in a pixel block of each of the plurality of shifted images with a pixel value of a positionally corresponding pixel in the pixel block of the second feature image.

10. The method according to claim 8,
wherein the performing of the plurality of translational shifts comprises:
shifting a number of leftmost or rightmost columns of pixels in a pixel block of the second feature image to be the rightmost and leftmost column, respectively, of the pixel block; and
shifting b number of bottommost or topmost rows of pixels in the pixel block of the second feature image to be the topmost or bottommost row, respectively, of the pixel block,
wherein 0≤a<Y, 0≤b<X, each of a and b being an integer, Y being a total number of columns of pixels in the pixel block of the second feature image, and X being a total number of rows of pixels in the pixel block of the second feature image, and
wherein a and b may be the same or different.

11. The method according to claim 10,
wherein at least one of a and b changes at least once during the performing of the plurality of translational shifts.

12. The method according to claim 8,
wherein the performing of the plurality of translational shifts comprises:
deleting a number of leftmost or rightmost columns of pixels in a pixel block of the second feature image, and adding a number of columns of pixels at the rightmost or leftmost position, respectively, of the pixel block; and
deleting b number of bottommost or topmost rows of pixels in the pixel block of the second feature image, and adding b number of rows at the topmost or bottommost position, respectively, of the pixel block,
wherein 0≤a<Y, 0≤b <X, each of a and b being an integer, Y being a total number of columns of pixels in the pixel block of the second feature image, and X being a total number of rows of pixels in the pixel block of the second feature image, and
wherein each of the added pixels has a pixel value of 0.

13. The method according to claim 12,
wherein at least one of a and b changes at least once during the performing of the plurality of translational shifts.

14. The method according to claim 8, further comprising performing X*Y translational shifts, Y being a total number of columns of pixels in a pixel block of the second feature image, and X being a total number of rows of pixels in the pixel block of the second feature image.

15. The method according to claim 8, further comprising, before the generating of the first feature image, receiving the training image,
    wherein the generating of the first feature image comprises generating a luminance feature image based on luminance information of the training image.

16. The method according to claim 15, further comprising determining a luminance value of a pixel at a given position in the luminance feature image according to the following formula (1):

$$I = 0.299R + 0.587G + 0.114B \quad (1)$$

wherein:
I is the luminance value,
R is a red component value of a positionally corresponding pixel in the training image,
G is a green component value of the positionally corresponding pixel in the training image, and
B is a blue component value of the positionally corresponding pixel in the training image.

17. The method according to claim 15, further comprising normalizing the luminance feature image according to the following formula (2):

$$\begin{cases} N = \dfrac{I - \mu}{\sigma - 1} \\ \sigma^2 = \mathrm{Blur}(I^2) - \mu \\ \mu = \mathrm{Blur}(I) \end{cases} \quad (2)$$

wherein:

N is the first feature image,

I represents the luminance feature image, Blur(I) is an image obtained by applying a Gaussian filter to the luminance feature image, and Blur($I^2$) is an image obtained by squaring every pixel value in the luminance feature image, and then applying the Gaussian filter to the image.

18. The method according to claim 8, wherein the first feature image comprises a pixel block having a first size, wherein each of the plurality of shifted images and each of the plurality of correlation images comprises a pixel block having the first size, and wherein in each of the plurality of shifted images, a pixel having a non-zero pixel value has a corresponding pixel with the same non-zero pixel value in the first feature image.

19. A non-transitory computer-readable medium storing instructions that cause a computer to execute the method according to claim 8.

* * * * *